United States Patent
Ambriss et al.

(10) Patent No.: US 9,282,171 B2
(45) Date of Patent: Mar. 8, 2016

(54) CONTEXT ESTABLISHMENT IN MARGINAL GRANT CONDITIONS

(71) Applicant: QUALCOMM Incorporated, San Diego, CA (US)

(72) Inventors: Mouaffac Ambriss, San Diego, CA (US); Mutaz Zuhier Afif Shukair, San Diego, CA (US); Navid Ehsan, San Diego, CA (US); Kausik Ray Chaudhuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 14/199,814

(22) Filed: Mar. 6, 2014

(65) Prior Publication Data

US 2015/0256653 A1    Sep. 10, 2015

(51) Int. Cl.
| | |
|---|---|
| H04L 29/06 | (2006.01) |
| H04W 28/02 | (2009.01) |
| H04L 12/805 | (2013.01) |
| H04W 28/06 | (2009.01) |

(52) U.S. Cl.
CPC ............ *H04L 69/04* (2013.01); *H04L 47/36* (2013.01); *H04L 69/22* (2013.01); *H04W 28/0231* (2013.01); *H04L 65/80* (2013.01); *H04W 28/06* (2013.01)

(58) Field of Classification Search
None
See application file for complete search history.

(56) References Cited

U.S. PATENT DOCUMENTS

| | | | | |
|---|---|---|---|---|
| 6,973,097 | B1 * | 12/2005 | Donzis | H04W 80/04 370/395.52 |
| 2003/0076850 | A1 * | 4/2003 | Jason, Jr. | H04L 12/2697 370/414 |
| 2004/0071140 | A1 * | 4/2004 | Jason | H04L 47/10 370/392 |
| 2005/0160184 | A1 * | 7/2005 | Walsh | H04L 12/1868 709/247 |
| 2005/0259690 | A1 * | 11/2005 | Garudadri | H04L 29/06 370/477 |
| 2006/0104266 | A1 * | 5/2006 | Pelletier | H03M 7/30 370/389 |
| 2007/0076618 | A1 * | 4/2007 | Hirose | H04L 47/10 370/249 |
| 2007/0195764 | A1 * | 8/2007 | Liu | H04W 28/24 370/389 |
| 2007/0211724 | A1 * | 9/2007 | Johansson | H04L 49/00 370/392 |
| 2009/0268667 | A1 | 10/2009 | Gandham et al. | |
| 2012/0201205 | A1 | 8/2012 | Gopalakrishnan et al. | |

(Continued)

OTHER PUBLICATIONS

ISA/EPO, International Search Report and Written Opinion of the International Searching Authority, Int'l Appl. No. PCT/US2015/017113, Jun. 2, 2015, European Patent Office, Rijswijk, NL, 11 pgs.

*Primary Examiner* — Brian Roberts
(74) *Attorney, Agent, or Firm* — Holland & Hart LLP

(57) ABSTRACT

Methods, systems, and devices are described for data transmission using header compression techniques that may include dropping all of a portion of a payload for one or more Protocol Data Units (PDUs). A wireless communications device may determine that a robust header compression (RoHC) mode is in an initialization and refresh (IR) state, indicating a full Packet Data Convergence Protocol (PDCP) Protocol Data Unit (PDU), including complete header information, is to be transmitted. The wireless communications device may identify that a payload of at least part of a media frame is to be transmitted in the IR state, and drop at least part of the payload when a probability of segmenting the payload during transmission in the IR state exceeds a threshold.

28 Claims, 17 Drawing Sheets

(56) References Cited

U.S. PATENT DOCUMENTS

| | | |
|---|---|---|
| 2013/0064177 A1 | 3/2013 | Venkatachalam et al. |
| 2013/0107895 A1 | 5/2013 | Wentink |
| 2013/0121345 A1 | 5/2013 | Zhang et al. |
| 2013/0195056 A1 | 8/2013 | Liu et al. |
| 2013/0343276 A1 | 12/2013 | Charpentier et al. |

* cited by examiner

CONTEXT ESTABLISHMENT IN MARGINAL GRANT CONDITIONS

BACKGROUND

The following relates generally to wireless communication, and more specifically to data transmission via a wireless communication device using header compression. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

In order to conserve resources, transmitters and/or receivers in a wireless communications system may perform various compression functions to reduce the amount of data transmitted using the air interface of the transmitter and/or receiver. One such compression function may be a technique known as Robust Header Compression (RoHC), in which duplicative data from multiple headers may be reduced, and remaining data compressed. Such RoHC techniques may be implemented when relatively large amounts of data are transmitted, such as in the case of streaming or Voice over Internet Protocol (VoIP) calls, for example. These RoHC techniques are effective to conserve air interface resources related to transmission of headers, but in certain situations the size of a transmission, including the header information and associated payload, may exceed the size of a resource grant for transmission.

SUMMARY

The described features generally relate to one or more improved systems, methods, and/or apparatuses for data transmission using header compression techniques. In some examples, a wireless communications device may determine that a robust header compression (RoHC) mode is in an initialization and refresh (IR) state, indicating a full Packet Data Convergence Protocol (PDCP) Protocol Data Unit (PDU), including complete header information, is to be transmitted. The wireless communications device may identify that a payload of at least part of a media frame is to be transmitted in the IR state, and drop at least part of the payload when a probability of segmenting the payload during transmission in the IR state exceeds a threshold.

In certain examples, a device may determine that a combined size of a RoHC header and a payload to be transmitted with the RoHC header exceed a predetermined threshold, and may drop at least part of the payload responsive to the determining. In other examples, a device may determine a combined size of a RoHC header and a payload to be transmitted with the RoHC header, may determine a probability of segmenting based on the combined size, and may delay a transmission of the RoHC header and payload when the probability of segmenting exceeds a threshold.

In a first set of illustrative embodiments, a method of wireless communication may include identifying a state transition of a compressor side of a robust header compression (RoHC) protocol to an initialization and refresh (IR) state; identifying that a payload of at least part of a media frame is to be transmitted in the IR state; and dropping at least part of the payload when a probability of segmenting the payload during transmission in the IR state exceeds a threshold. In some examples, the probability of segmenting the payload is based at least in part on a predetermined number of protocol data units (PDUs) exceeding a PDU count threshold. The probability of segmenting the payload may be based at least in part on, for example, resources available for the transmission of a RoHC header and the payload. Such resources may include, in some examples, one or more of: an amount of uplink resources assigned in an uplink grant; an amount of downlink resources available for the transmission; or a modulation and coding scheme to be used for the transmission.

In some examples, the probability of segmenting the payload may be based at least in part on a power headroom value. In certain examples, the probability of segmenting the payload may be based at least in part on a channel condition of an radio frequency (RF) channel used for the transmission. Additionally or alternatively, the probability of segmenting the payload may be based at least in part on one or more of a Sounding Reference Signal (SRS) measurement, a distance from a receiver of the transmission, or a pathloss from the receiver of the transmission. In certain examples, the identifying the transition of RoHC to the IR state may include one or more of identifying a handover condition, identifying an media frame error rate, or identifying a Block Error Rate exceeding a threshold.

In some examples, the dropping at least part of the payload may include dropping a predetermined number of protocol data units (PDUs). The predetermined number of PDUs may be based at least in part on a data type of the payload, for example. In other examples, the predetermined number of PDUs may be based at least in part on the segmentation of the payload exceeding a certain number of PDUs. In certain examples, the dropping at least part of the payload may include determining an amount of available resources for transmission; determining a combined size of a complete header and the payload; and dropping a portion of the payload that exceeds a difference between the combined size and the amount of available resources. Dropping at least part of the payload may include, for example, dropping least significant bit(s) of the payload that exceed the difference between the combined size and the amount of available resources.

In a second set of illustrative embodiments, a method of wireless communication may include determining that a combined size of a robust header compression (RoHC) header and a payload to be transmitted with the RoHC header exceed a predetermined threshold; and dropping at least part of the payload, responsive to the determining, to keep the combined size less than the predetermined threshold. The dropping may include, for example, dropping a contiguous part of the payload. In some examples, the dropped payload may be unrecoverable. In certain examples, the determining may include determining that the RoHC header comprises an extension packet type.

In certain examples, the method may also include determining that a second combined size of a second RoHC header and a second payload to be transmitted with the second RoHC header exceed the predetermined threshold; and transmitting the second RoHC header in place of the payload. The method may also include, in examples, dropping a contiguous part of the second payload to generate a modified second payload; and the transmitting may include transmitting the second RoHC header and modified second payload in place of the payload.

In certain examples, the predetermined threshold may be determined based on: an amount of available resources for transmission; a size of the RoHC header; and a size of the payload. In some examples, dropping at least part of the payload may include dropping a portion of the payload that exceeds a difference between the combined size of the RoHC header and the payload, and the amount of available resources. In other examples, dropping at least part of the payload may include dropping one or more least significant bit(s) of the payload that exceed a difference between the combined size of the RoHC header and the payload, and an amount of available resources. In further examples, dropping at least part of the payload may include dropping a predetermined number of protocol data units (PDU) payloads.

In another set of illustrative embodiments, an apparatus for wireless communication may include means for identifying a state transition of a robust header compression (RoHC) mode to an initialization and refresh (IR) state; means for identifying that a payload of at least part of a media frame is to be transmitted in the IR state; and means for dropping at least part of the payload when a probability of segmenting the payload during transmission in the IR state exceeds a threshold.

In certain examples, the apparatus may implement one or more aspects of the first set of illustrative embodiments described above.

In another set of illustrative embodiments, an apparatus for wireless communication may include a processor; and memory in electronic communication with the processor. The memory may embody instructions executable by the processor to: identify a state transition of a robust header compression (RoHC) mode to an initialization and refresh (IR) state; identify that a payload of at least part of a media frame is to be transmitted in the IR state; and drop at least part of the payload when a probability of segmenting the payload during transmission in the IR state exceeds a threshold.

In certain examples, the apparatus may implement one or more aspects of the first set of illustrative embodiments described above.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Described embodiments are directed to one or more improved systems, methods, and/or apparatuses for data transmission using header compression techniques. In some examples, a wireless communications device may determine that a robust header compression (RoHC) mode is in an initialization and refresh (IR) state, indicating a full Packet Data Convergence Protocol (PDCP) Protocol Data Unit (PDU), including complete header information, is to be transmitted. The wireless communications device may identify that a payload of at least part of a media frame is to be transmitted in the IR state, and drop at least part of the payload when a probability of segmenting the payload during transmission in the IR state exceeds a threshold.

In certain examples, a device may determine that a combined size of a RoHC header and a payload to be transmitted with the RoHC header exceed a predetermined threshold, and may drop at least part of the payload responsive to the determining. The part of the payload that is dropped may be a contiguous part of the payload, and may not be recoverable. In other examples, a device may determine a combined size of a RoHC header and a payload to be transmitted with the RoHC header, may determine a probability of segmenting based on the combined size, and may delay a transmission of the RoHC header and payload when the probability of segmenting exceeds a threshold.

In some examples, the wireless communications device may determine that the payload is a certain type of payload before dropping all or part of the payload, or delaying transmission. For example, if the data being transmitted is a VoIP data stream, various mechanisms of the transmission of the data stream may allow a certain amount of data to not be received or allow for a certain latency without degrading quality. In such cases, the wireless communications device may delay transmission or drop payload of up to a predetermined number of PDUs, such as, for example, payloads for up to three PDUs. Dropping of a payload may allow RoHC header information to be transmitted without segmentation, and may thus lead to a faster transition to a compressed header, and thereby reduce overall segmentation that may occur in such situations. In certain examples, a payload of a first PDU may be dropped and a header of a second PDU may be transmitted in place of the dropped first payload, which may lead to a faster transition to a compressed header. Delaying transmission until sufficient resources are available to perform the transmission without segmenting may also lead to a faster transition to a compressed header.

Figure 1:
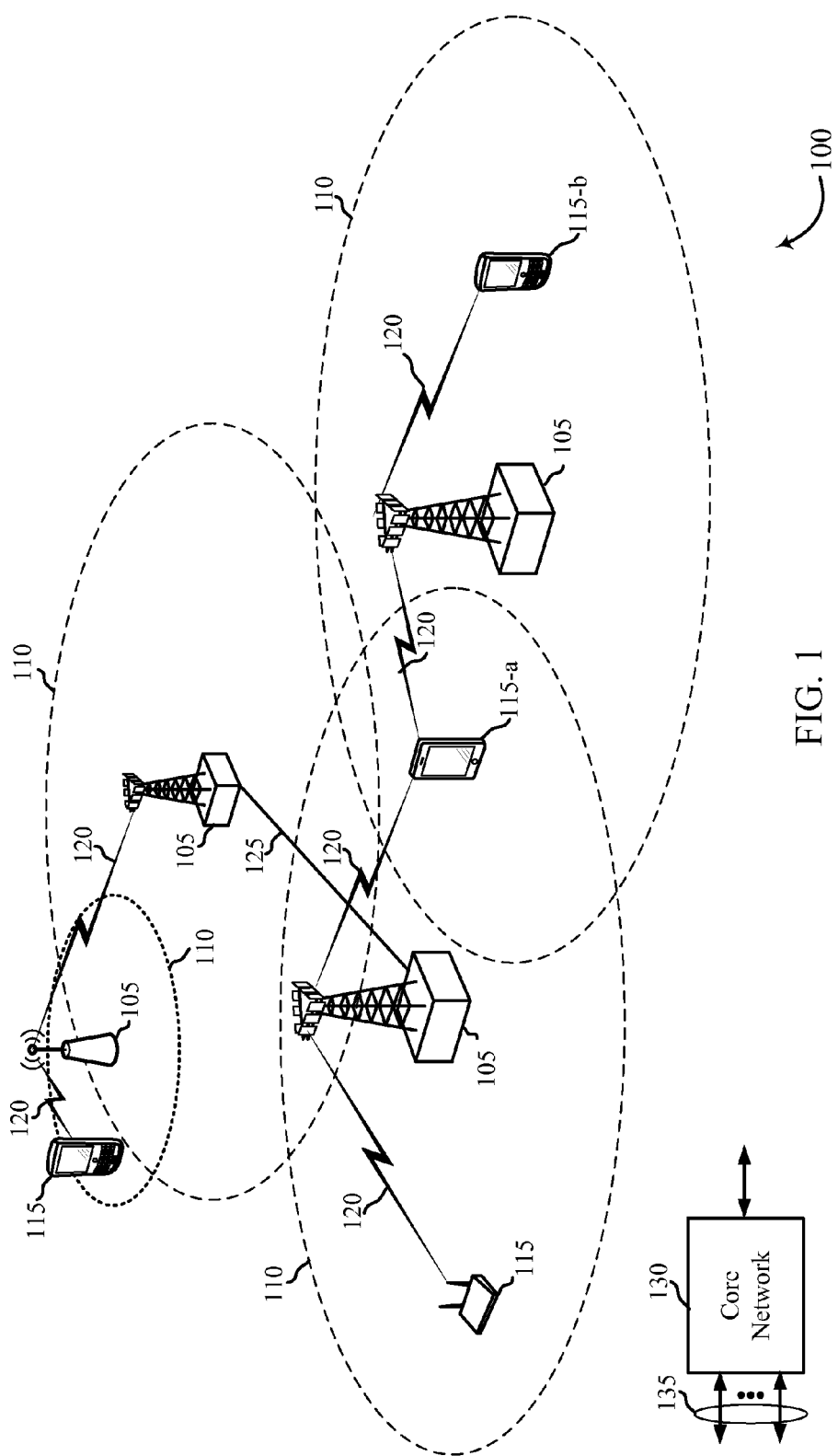
FIG. 1 shows an example wireless communications system diagram of mobile devices communicating with multiple base stations according to aspects of the disclosure.

Referring first to FIG. 1, an example wireless communication system 100 may include a plurality of UEs 115 that may communicate with a core network 130 via one or more base stations (or cells) 105. The base stations 105 may communicate with the UEs 115 under the control of a base station controller (not shown), which may be part of the core network 130. Base stations 105 and UEs 115 may be referred to generally as wireless communications devices.

Base stations 105 may communicate control information and/or user data with the core network 130 through backhaul links 135 (e.g., S1, etc.). In some embodiments, the base stations 105 may communicate, either directly or indirectly, with each other over backhaul links 125 (e.g., X2, etc.), which may be wired or wireless communication links. The wireless communication system 100 may support operation on multiple carriers (waveform signals of different frequencies). Multi-carrier transmitters can transmit modulated signals simultaneously on the multiple carriers. For example, each communication link 120 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In some embodiments, the base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a first base station 105 may be divided into sectors making up only a portion of the coverage area (not shown). The wireless communication system 100 may include base stations 105 of different types (e.g., macro, micro, and/or pico base stations). There may be overlapping coverage areas for different technologies.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 are dispersed throughout the wireless communication system 100, and each UE 115 may be stationary or mobile. A UE 115 may also be referred to as a mobile device, a mobile station, a subscriber station, a mobile unit, a subscriber unit, a wireless unit, a remote unit, a UE, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a two-way radio, a radio cellular phone, a personal digital assistant (PDA), a wireless modem, a wireless communication device, a handheld device, a tablet computer, a laptop computer, a cordless phone, a wireless local loop (WLL) station, or the like.

The communication links 120 shown in wireless communication system 100 may include uplink (UL) and/or downlink (DL) transmissions from a UE 115 to base stations 105. The downlink transmissions may also be called forward link transmissions while the uplink transmissions may also be called reverse link transmissions. The communication links 120 may utilize different air interfaces of different radio access technologies (RATs).

In various embodiments described herein, a UE 115 may be configured to support voice communications with one or more other UEs 115. For example, if a user of UE 115-a wishes to call another user of UE 115-b, the user may control the UE 115-a to initiate a call, which may initiate a setup procedure with a base station 105 and then initiate a voice call. Such a voice call may be implemented using a VoIP technique, including, for example, a Voice over LTE (VoLTE) technique, in which a user's voice may be digitized and packetized and transmitted as a stream of data. The stream of data may be transmitted as PCDP PDUs having a header and a payload. Often, in VoIP traffic, the header size compared to payload sizes are relatively high. Robust header compression (RoHC) thus plays an important role in reducing the header size of such media frames, thereby conserving air interface resources between a UE 115 and base station 105.

When a complete header, or one or more header extensions, is required to be transmitted, in certain situations a UE 115 or base station 105 may not have sufficient air interface resources to transmit the header data and associated payload data. In such situations, a processes known as segmenting may occur, in which a PDCP PDU is segmented into smaller sized PDUs and transmitted over multiple resource grants. Various aspects of the present disclosure provide techniques for reducing segmentation through dropping or delaying transmission of certain payload data. Such reduced segmentation may allow RoHC to proceed to a fully compressed state more quickly and thereby enhance the efficiency of the wireless communications network 100.

Figure 2A:
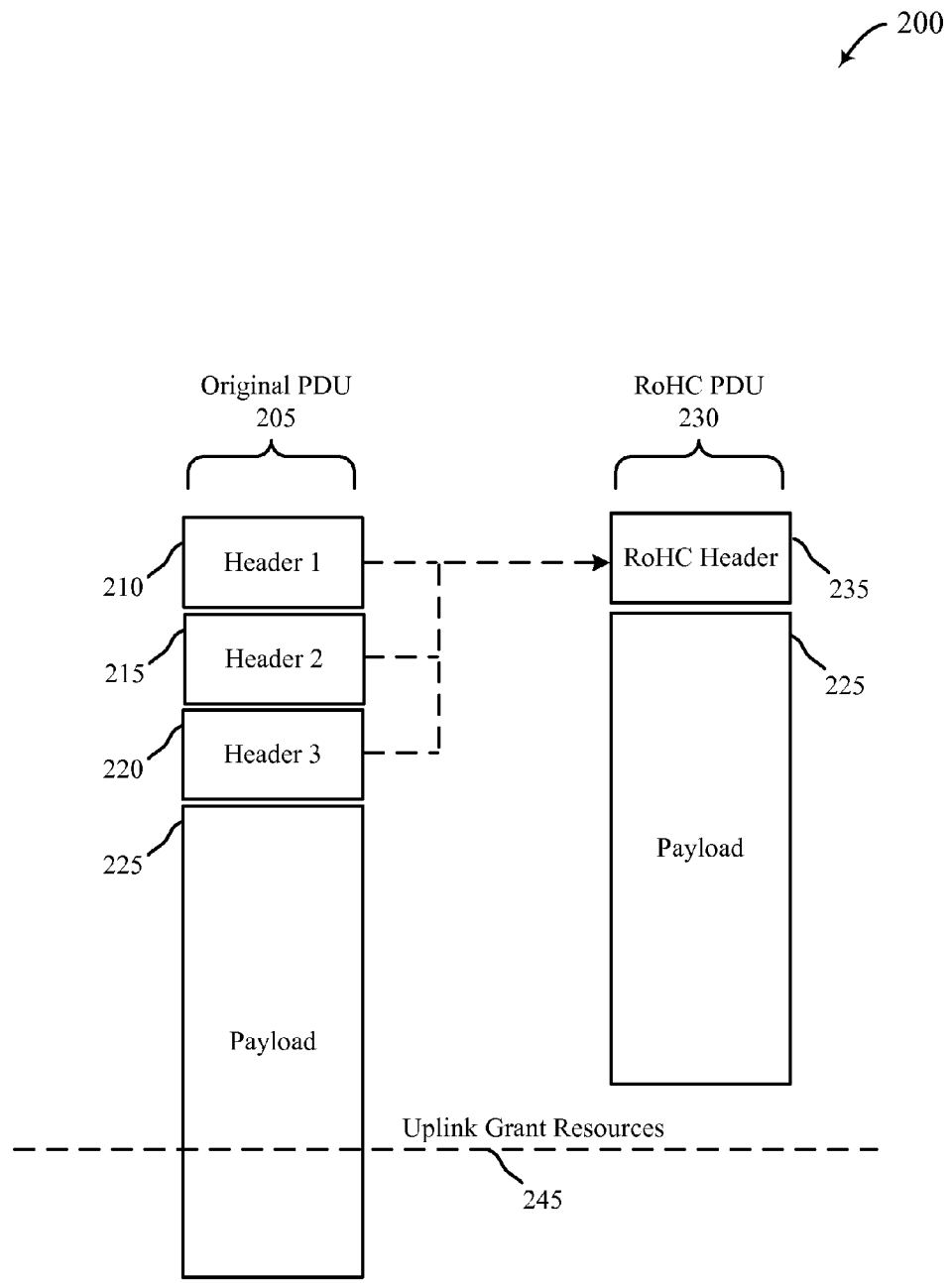
FIG. 2A shows an example of Robust Header Compression (RoHC) techniques in wireless communications according to aspects of the disclosure.

Turning now to FIG. 2A, block diagram illustrates structures 200 of complete headers and RoHC compressed headers and associated payloads that may be used in a wireless communication system, including the wireless communication system 100 described above with reference to FIG. 1. For example, structures 200 may be used in LTE/LTE-A or similar systems. An original PDU 205 may include three distinct types of header information 210, 215, and 220, followed by a payload 225 of data. A compressed PDU 230 may include a RoHC header 235 that includes information from the three non-compressed headers 210, 215, and 220, for example. When referring to PDU 205 as being an original PDU or a compressed PDU, reference is made to the compression state of the header information 210, 215, and 220 of the PDU 205, and not to a compression state of payload 225, which may have been processed by one or more compression techniques at one or more higher layers, for example.

In some cases, uplink grant resources 245 may be insufficient to transmit all of the header and payload data for a non-compressed PDU 205, but may be sufficient to transmit the original headers 210, 215, and 220. Thus, if the complete original PDU 205 were to be transmitted, segmentation would be applied that requires separate uplink grant resources 245 for separate transmissions in order to send the complete original PDU. If a RoHC header 235 is used, the uplink grant resources 245 may be sufficient to transmit both the RoHC header 235 and payload 225. In some examples, all or part of payload 225 may be dropped from the transmission of an original PDU 205. In such a manner, the complete header 210, 215, and 220 information may be transmitted in a single uplink resource grant 245, without segmentation. Thus, the system may move to a compressed header, such as RoHC header 235, more quickly.

Figure 2B:
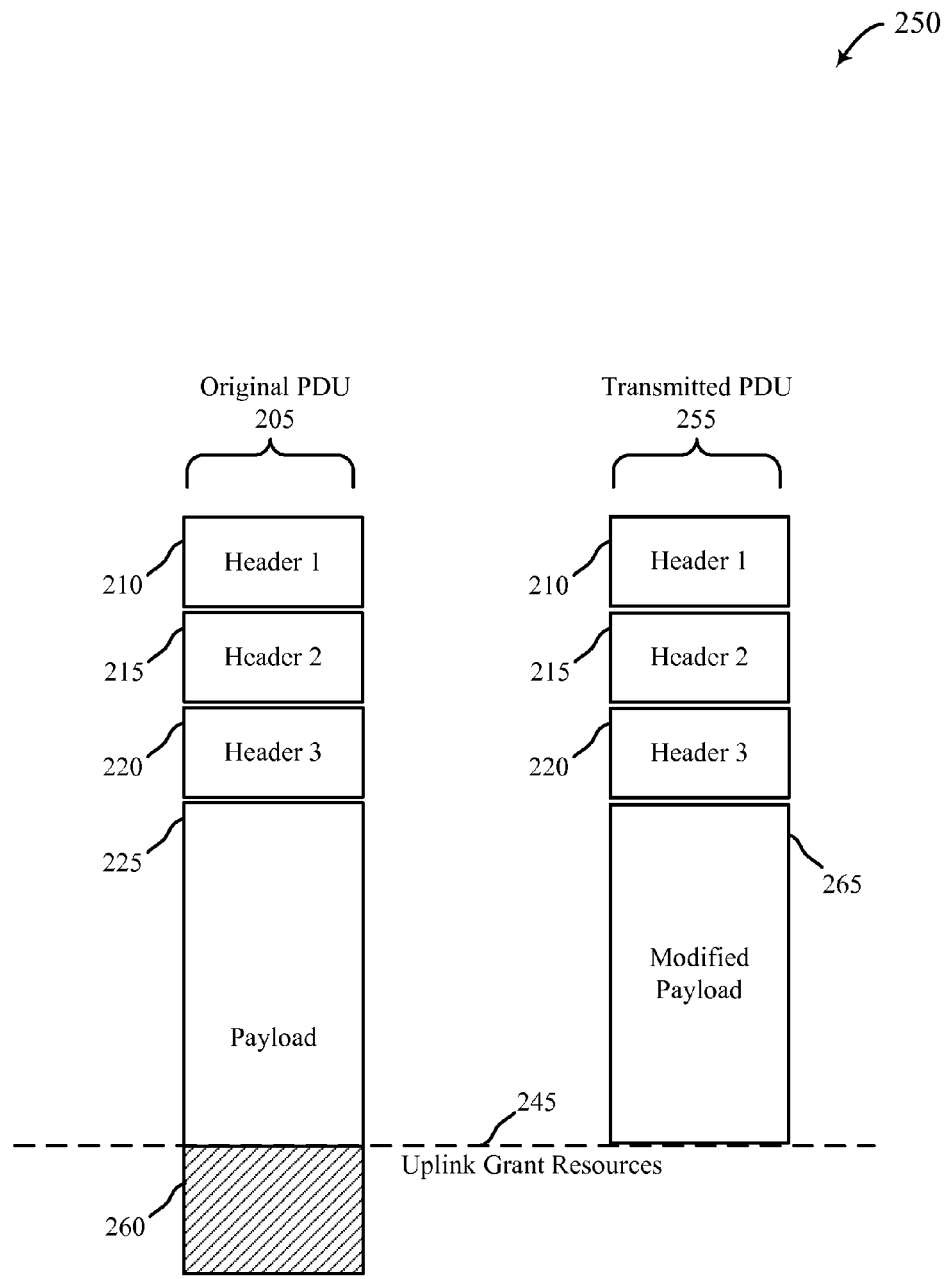
FIG. 2B shows an example of reduced payload size in wireless communications according to aspects of the disclosure.

Turning now to FIG. 2B, block diagram illustrates structures 250 of an original PDU 205 and a transmitted PDU 255 that may be used in a wireless communication system, including the wireless communication system 100 described above with reference to FIG. 1. Structures 250, similarly as discussed above, may be used in LTE/LTE-A or similar systems. The original PDU 205, as described with respect to FIG. 2A, may include three distinct types of header information 210, 215, and 220, followed by a payload 225 of data. In some examples, part of payload 260 may be dropped, thus creating a modified payload 265 that may be transmitted in the transmitted PDU 255, which may be transmitted in a single uplink resource grant 245, without segmentation. In other examples, as noted above, the entire payload 225 may be dropped from the transmitted PDU. In some examples, the dropped part of the payload 260 may be a contiguous portion of the payload 225, and may be dropped irrespective of the data contained in that particular portion of the payload 225. In some examples, the dropped part of the payload 260 may include the least significant bits of the payload. In any event, the dropped portion of the payload may not be recovered following transmission of the transmitted PDU 255. The payload 225, in some examples, may have been processed by a compression process of one or more higher layers.

Figure 2C:
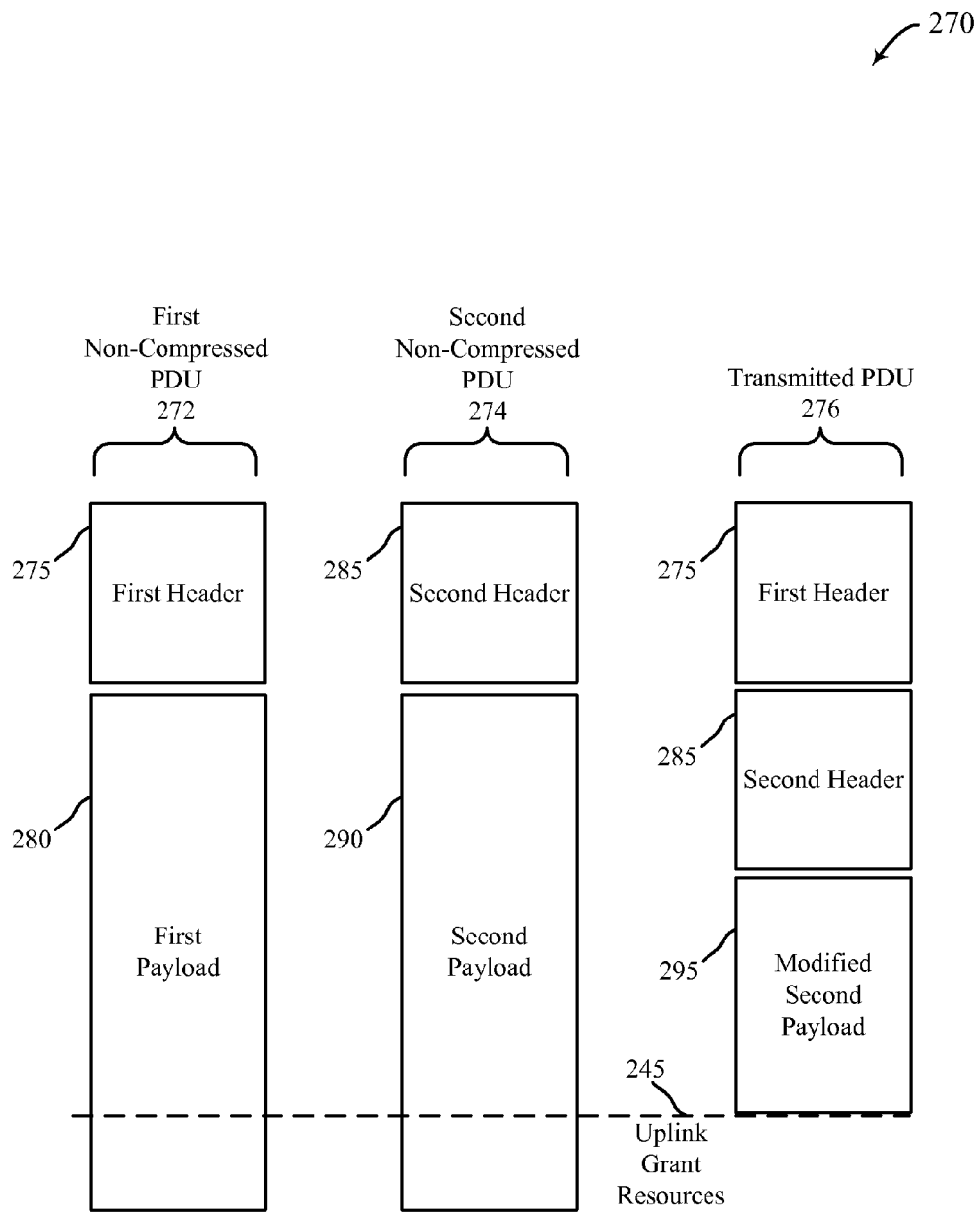
FIG. 2C shows an example of combining successive headers in wireless communications according to aspects of the disclosure.

Turning now to FIG. 2C, block diagram illustrates structures 270 of multiple non-compressed PDUs 272, 274, portions of which may be combined into a transmitted PDU 276. Structures 270 may be used in a wireless communication system, including the wireless communication system 100 described above with reference to FIG. 1, and may, similarly as discussed above, be used in LTE/LTE-A or similar systems. In this example, The a first non-compressed PDU 272 may include a non-compressed header 275 and a first payload 280. Non-compressed first header 275 may include multiple types of distinct header information (e.g., header information 210, 215, and 220 of FIG. 2A and/or FIG. 2B).

In this example, a combined size of the first header 275 and first payload 280 may exceed uplink grant resources 245. In this example, a second non-compressed PDU 274 may also be present, and may include non-compressed second header 285 and a second payload 290, the combined size of which may also exceed uplink grant resources 245. In the example of FIG. 2C, the first payload 280 may be dropped and the second header 285 may be transmitted in place of the first payload 280 in transmitted PDU 276. In some examples, both the first payload 280 and the second payload 290 may be dropped, and simply the first header 275 and second header 285 may be transmitted in the transmitted PDU 276. In other examples, such as illustrated in FIG. 2C, a portion of the second payload 290 may be dropped to create a modified second payload 295, such that a combined size of the first header 295, the second header 285, and the modified second payload 295 is less than the size threshold defined by the uplink grant resources 245. In such a manner, multiple headers from consecutive PDUs may be provided, which may allow the system may move to a compressed header (e.g., RoHC header 235 of FIG. 2A) more quickly.

Figure 3:
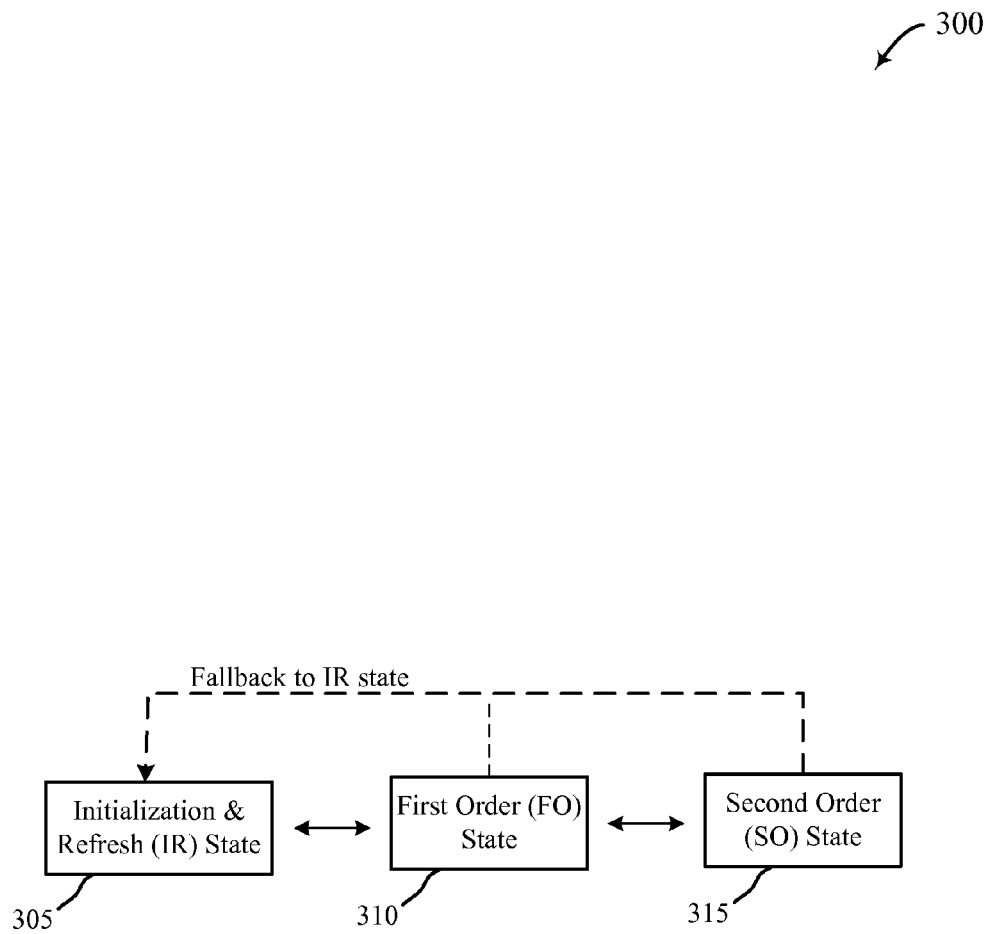
FIG. 3 shows an example of various different RoHC states that may be implemented in wireless communications according to aspects of the disclosure.

Turning now to FIG. 3, block diagram illustrates states 300 of RoHC compression that may be used in a wireless communication system, including the wireless communication system 100 described above with reference to FIG. 1. For example, states 300 may be used in LTE/LTE-A or similar systems for header compression, including header compression described in FIGS. 2A through 2C. An initialization and refresh state (IR) state 305 may be a non-compressed state, in which full header information is transmitted. In some examples, full header (e.g., full PDCP context information) may be required to be transmitted a predetermined number of times. Once the full header has been transmitted the required number of times, the RoHC compressor may move to a first order (FO) state, in which certain redundant information may be removed and the header compressed. The RoHC compressor may then move to a second order (SO) state 315 following a sufficient number of FO headers, in which headers may be further compressed.

The system may fall back to the IR state 305 from either the FO state 310 or the SO state 315. The RoHC compressor can fall back to IR state 305 under handover conditions, aggressive Block Error Rate (BLER) conditions or upon detection of other implementation errors. When the RoHC compressor falls back to IR state 305 in normal grant conditions, a complete PDCP PDU may be transmitted that contains both the complete header and payload. However, as noted above, if the assigned air interface resource grant is too small to fit the complete PDCP PDU, then segmentation may be performed to send the PDCP PDU into smaller PDU units. According to certain examples, if the RoHC is in IR state 305 and low grant conditions are detected, then RoHC may be allowed to sacrifice all or a portion of the payload bytes, by dropping them. In return faster transition to FO state 310 or SO state 315 may be established, under which fewer resources will be required to keep operating in this state.

For example, for the first few subframes after a handover of a UE from a first base station to a second base station, UL/DL grants may be too small to send a complete PDCP PDU. Furthermore, RoHC may have to fall back to IR state 305 after handover, thus the first few PDCP PDUs may tend to experience RLC segmentations due to the absence of compression and having relatively low grant size. According to examples, the above implementation can be applied to drop all or part of the payload for a certain number of PDUs after handover, which may help RoHC to establish context and move to FO state 310 or SO state 315 more quickly.

Figure 4:
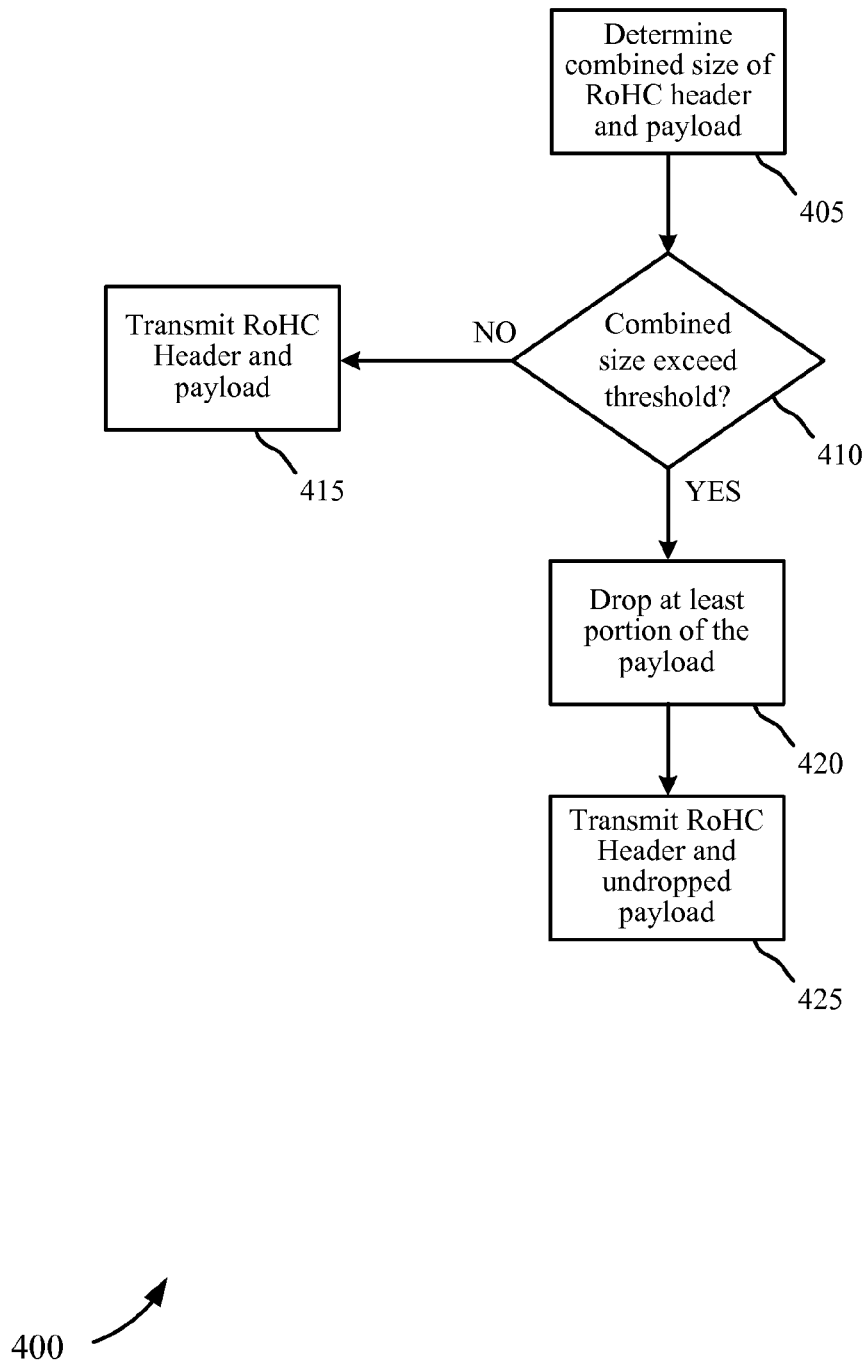
FIG. 4 is a flowchart of a method for reducing payload size for a wireless communications device according to aspects of the disclosure.

FIG. 4 shows a flowchart of a method 400 for reducing payload size for a wireless communications device according to aspects of the disclosure. The method 400 may be implemented by one or more of the UEs 115 or base stations 105 of the preceding figures. Additionally or alternatively, the operations of the method 400 may be performed by the UEs 115, base stations 105, or wireless communications devices 605 described with reference to FIGS. 6, 7, and/or 8.

At block 405, the method may include determining a combined size of RoHC header and payload that is to be transmitted in a PDU. The combined size may be based, for example, on one or more of an available air interface resources available for transmission of the header and payload, a size of the RoHC header, or a size of the payload. At block 410, the method may determine whether the combined size exceeds a threshold. For example, it may be determined if the combined size exceeds the transmission capacity of the available resources for transmission, such as a size of an uplink resource grant. The combined size may exceed the threshold, for example, if the RoHC compression is in an IR state, and/or if one or more RoHC header extension packet types are included in the header. If the combined size does not exceed the threshold, the device may transmit the RoHC header and payload, as indicated at block 415. If the combined size does exceed the threshold, at least a portion of the payload may be dropped, as indicated at block 420. In some examples, a contiguous portion of the payload that exceeds a difference between the size of the RoHC header, payload, and the available air interface resources may be dropped. In some examples, the dropped payload may be unrecoverable. The RoHC header and any undropped payload may be transmitted at block 425. In some examples, the least significant bit(s) of the payload that exceed the difference between the combined size of the header and payload, and the available resources, may be dropped. In other examples, a predetermined number of PDU payloads may be dropped, such as, for example, three payloads.

Figure 5:
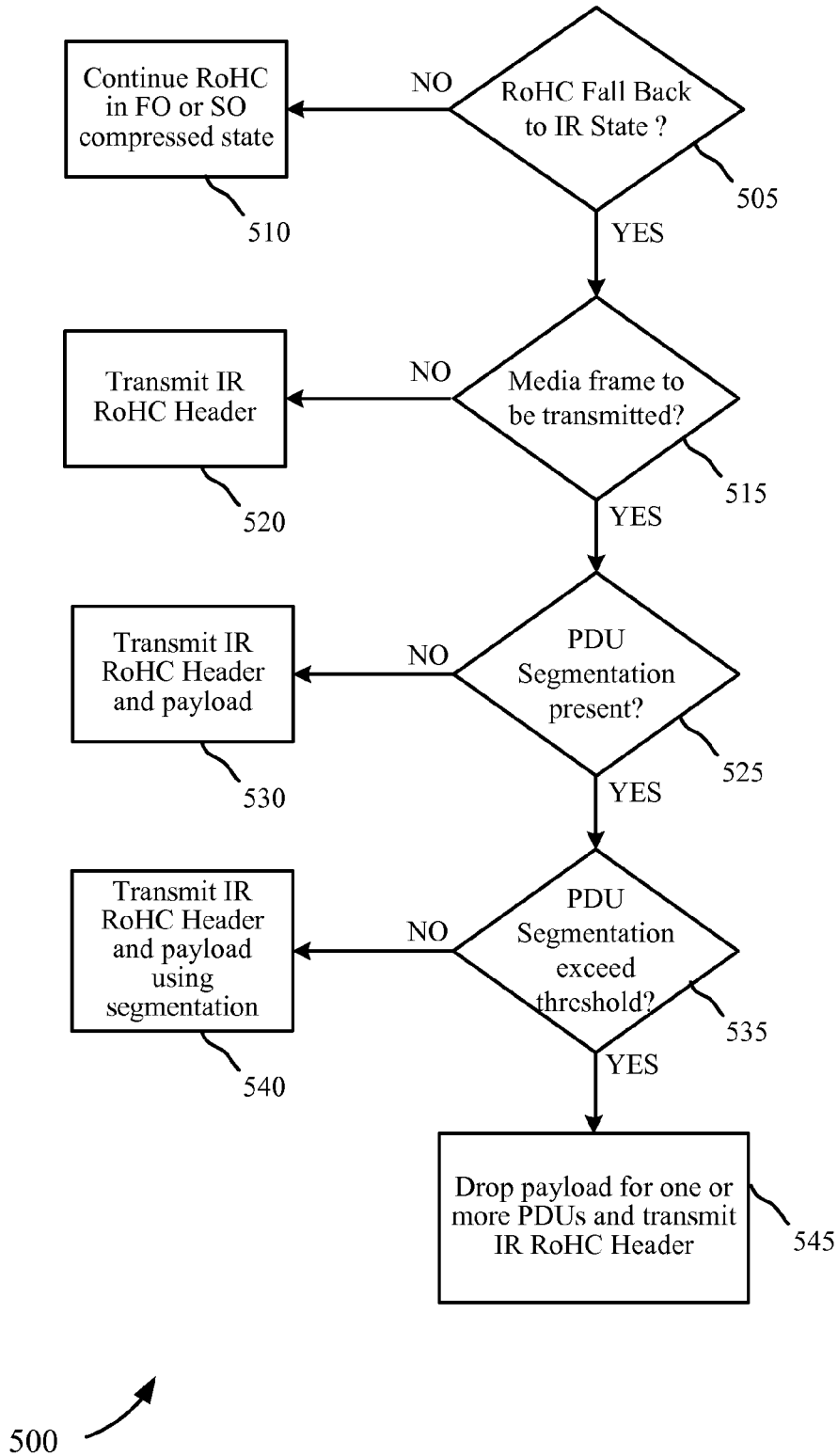
FIG. 5 is a flowchart of a method for reducing payload size for a wireless communications device based on a state of RoHC compression according to aspects of the disclosure.

FIG. 5 shows a flowchart of another method 500 for reducing payload size for a wireless communications device according to aspects of the disclosure. The method 500 may be implemented by one or more of the UEs 115 or base stations 105 of the preceding figures. Additionally or alternatively, the operations of the method 500 may be performed by the UEs 115, base stations 105, or wireless communications devices 605 described with reference to FIGS. 6, 7, and/or 8.

At block 505, the method may include determining whether the RoHC has fallen back to IR state. The determination may be made, for example, based on the identification of a handover condition. In other examples, the determination may be made based on one or more of a media frame error rate, or a block error rate exceeding a threshold. If such parameters exceed a threshold, it may be an indication that header information may need to be refreshed, for example.

If the RoHC has not fallen back to IR state, the method continues, at block 510, to continue RoHC in FO or SO compressed state. At block 515, it is determined if a media frame is to be transmitted. If a media frame is not to be transmitted, an IR RoHC header is transmitted, as indicated at block 520. If a media frame is to be transmitted, the method then determines, at block 525, whether PDU segmentation is present. In some examples, the determination of whether PDU segmentation is present is based on a probability that PDU segmentation may be present, such as, for example, following a handover or in cases of relatively high BLER.

In some examples, the probability of segmenting the payload is based at least in part on a predetermined number of PDUs exceeding a PDU size threshold. In other examples, the probability of segmenting the payload may be based at least in part on available resources for transmission. For example, a device may be granted an amount of uplink resources in an uplink grant. In other examples, a modulation and coding scheme of the available resources may impact the probability of segmentation. In some examples, the probability of segmenting the payload may be based at least in part on a power headroom value, with a relatively small power headroom indicating an increased probability for segmentation, for example. Additionally or alternatively, the probability of segmenting the payload may be based at least in part on a channel condition of an radio frequency (RF) channel used for the transmissions, a distance from a receiver of the transmissions, a pathloss from the receiver of the transmissions, and/or a sounding reference signal (SRS) measurement.

If PDU segmentation is not present, the IR RoHC header and payload is transmitted, as indicated at block 530. If PDU segmentation is present, it is determined whether the PDU segmentation exceeds threshold. For example, it may be determined if the PDU segmentation exceeds three PDUs. If PDU segmentation does not exceed the threshold, the IR RoHC header and payload are transmitted using segmentation, as indicated at block 540. If PDU segmentation does exceed the threshold, then payload, in this example, is dropped for one or more PDUs and transmit IR RoHC header, according to block 545.

In some examples, a contiguous portion of the payload may be dropped such as, for example, the least significant bits of the payload. In other examples, payload for a predetermined number of protocol data units (PDUs) may be dropped which may be based on, for example, a data type of the payload. For example, for VoIP data the payload for three PDUs may be dropped. In other examples, the number of PDUs that may be dropped is determined based on one or more other factors, such as channel conditions, a handover status, and/or power headroom, for example. In other examples, the number of PDUs with dropped payload may be based at least in part on the segmentation of the payload exceeding a certain number of PDUs. The dropped payload, or dropped portion of the payload, may be unrecoverable. Additionally or alternatively, dropping at least part of the payload may include determining available resources for transmission of the header and payload, determining a combined size of a complete header and payload, and dropping a portion of the payload that exceeds a difference between the combined size of the complete header and payload, and the available resources.

Figure 6A:
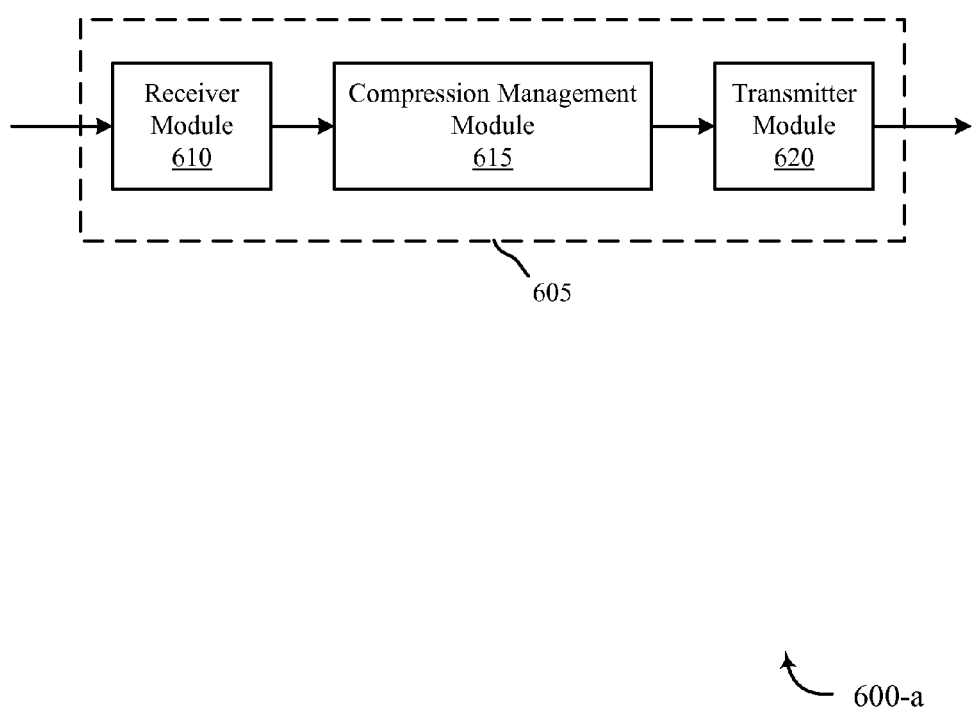
FIG. 6A shows a block diagram of an example of a wireless communications device according to aspects of the disclosure.

FIG. 6A shows a block diagram 600-a of an example of a wireless communications device 605. The wireless communications device 605 may be an example of one or more aspects of a UE 115 or base station 105 of FIG. 1, for example. The wireless communication device 605 may include a receiver module 610, a transmitter module 620 and a compression management module 615. The wireless communication device 605 may also include a processor (not shown), which may be part of the compression management module 615, for example. Each of these components may be in communication with each other.

The receiver module 610 may receive information such as packets, user data, and/or control information including headers, synchronization and pilot signals. The received information may be demodulated, descrambled, de-interleaved, and/or decoded. The information may be passed on to the compression management module 615, and to other components of the wireless communications device 605 as appropriate or desired.

The receiver module 610 may include a single receiver or multiple receivers. For example, the receiver module 610 may include N receive antennas and R RF chains (not shown), where R is generally less than or equal to N. Each RF chain may include an RF module and an analog-to-digital converter (ADC). During operation, signals received by a receive antenna may be provided to an input of an RF chain. At the RF chain, the signals are processed (e.g., amplified, downconverted, filtered, etc.) by an RF module and digitized by the ADC. The output of the RF chain may be provided to the demodulator for further processing. The demodulator may combine signals received from multiple antennas using receive diversity techniques to increase the SINR of the received signals. The demodulator may use a suitable signal combining technique such as equal gain combining, maximum ratio combining (MRC), and the like. The demodulator and RF chains may use interference cancellation techniques to further provide interference cancellation and/or suppression (e.g., interference rejection combining, successive interference cancellation, and the like).

The transmitter module 620 may transmit information such as packets, user data, and/or control information including headers, synchronization and pilot signals. The transmitted information may be modulated, scrambled, interleaved, and/or coded. The information may be received from the compression management module 615, and from other components of the wireless communications device 605 as appropriate or desired. In some embodiments, the transmitter module 620 may be collocated with the receiver module 610 in a transceiver module (not shown). The transmitter module 620 may include a single antenna, or it may include a plurality of antennas. The compression management module 615 may employ the transmitter module 620 and the receiver module 610 (or a transceiver module) to perform header compression, as described herein.

Further, the compression management module 615 may perform payload management, including dropping at least a portion of a payload, combining headers, and/or delaying a transmission based on certain conditions, as described herein. For example, the compression management module 615 may be configured to monitor a state of header compression, and drop some or all of a payload based on a probability of PDU segmentation or when a combined size of a header and payload exceed a threshold. In some examples, the compression management module 615 may combine headers of consecutive PDUs, and may drop some or all of a payload of one or more of the consecutive PDUs. In other examples, the compression management module 615 may delay transmission of a header and payload until sufficient resources are available for transmission of the header and payload.

Figure 6B:
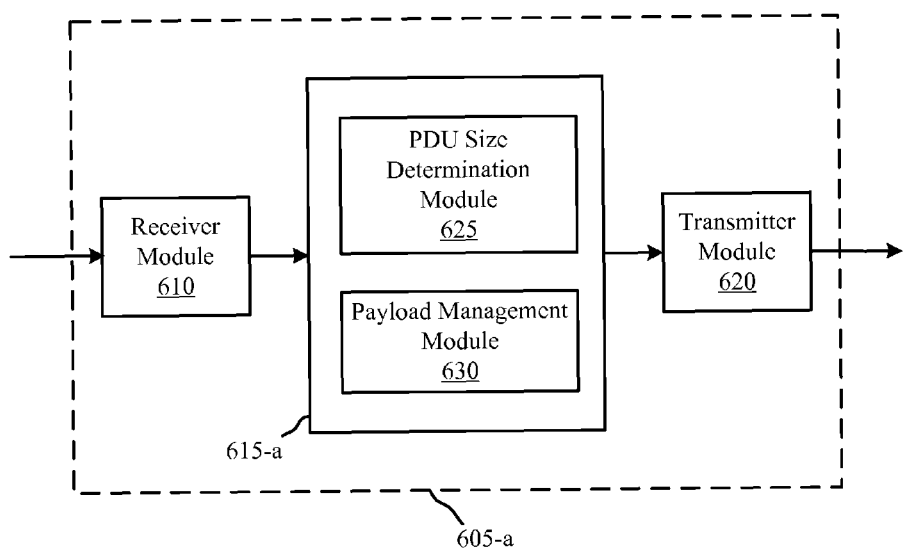
FIG. 6B shows a block diagram of another example of a wireless communications device according to aspects of the disclosure.

FIG. 6B shows a block diagram 600-b of an example of a wireless communications device 605-a. The wireless communications device 605-a may be an example of one or more aspects of a UE 115, a base station 105, or wireless communications device 605 described with reference to FIGS. 1 and/or 6A. The wireless communications device 605-a may include a receiver module 610, a transmitter module 620 and a compression management module 615-a. The wireless communications device 605-a may also include a processor (not shown), which may be part of the communications management module 615-a, for example. Each of these components may be in communication with each other.

The receiver module 610 and the transmitter module 620 may be configured and may be employed as described above with respect to FIG. 6A. The compression management module 615-a may be configured and may implement operations as described above with respect to the compression management module 615 of FIG. 4A.

Further, as illustrated in FIG. 6B, the compression management module 615-a may include a PDU size determination module 625. Such a PDU size determination may determine a combined size of a header and payload, according to some examples. The compression management module 615-a may also include a payload management module 630 that may perform operations to implement aspects of delaying transmission, combining headers, and/or dropping some of all of a payload as described herein.

Figure 6C:
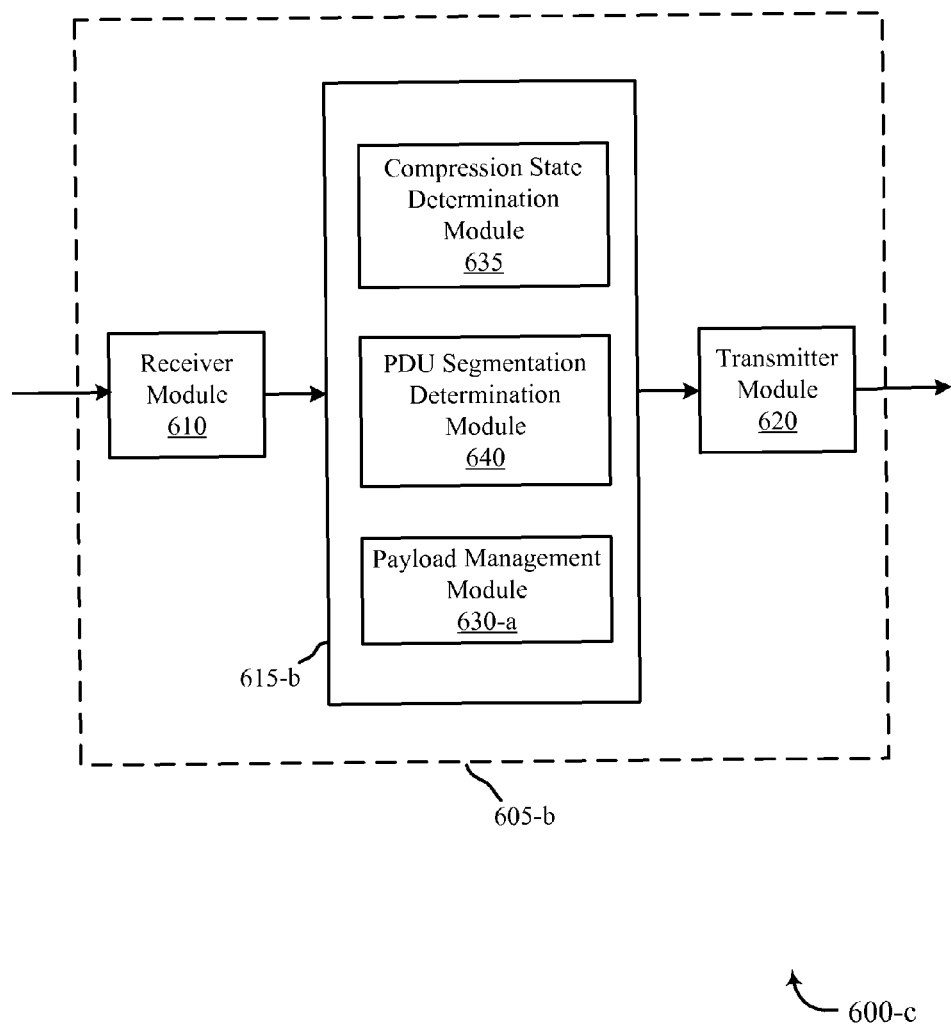
FIG. 6C shows a block diagram of yet another example of a wireless communications device according to aspects of the disclosure.

FIG. 6C shows a block diagram 600-c of an example of a wireless communications device 605-b. The wireless communications device 605-b may be an example of one or more aspects of a UE 115, a base station 105, or wireless communication device 605 described with reference to FIGS. 1, 4A and/or 4B. The wireless communications device 605-b may include a receiver module 610, a transmitter module 620 and a compression management module 615-b. The wireless communications device 605-b may also include a processor (not shown), which may be part of the communications management module, for example. Each of these components may be in communication with each other.

The receiver module 610 and the transmitter module 620 may be configured and may be employed as described above with respect to FIG. 6A. The compression management module 615-b may be configured and may implement operations as described above with respect to the compression management module 615 of FIG. 6A and/or as described above with respect to the compression management module 615-a of FIG. 6B. In some embodiments the compression management module 615-b may include a compression state determination module 635, a PDU segmentation determination module 640, and a payload management module 630-a.

The compression state determination module 635 may operate to monitor the compression state of a header compressor, such as a RoHC compressor, to determine whether the headers are being compressed according to a predetermined state of the compressor, such as an IR state, a FO state, or a SO state, for example. The PDU segmentation determination module 640 may make determinations related to whether PDU segmentation would be used for a particular PDU, or whether it is likely that PDU segmentation will be used for a particular PDU. The compression management module 615-a may also include a payload management module 630-a that may perform operations to implement aspects of delaying transmission, combining headers, and/or dropping some of all of a payload, as described herein.

Figure 7:
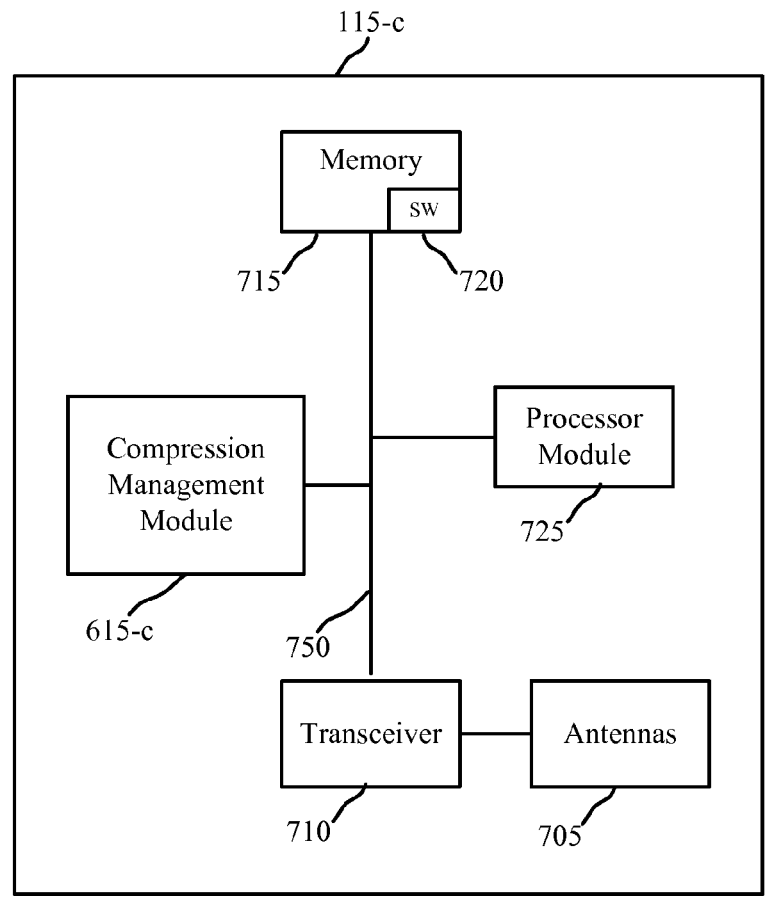
FIG. 7 shows a block diagram of a configuration for implementing a UE according to aspects of the disclosure.

FIG. 7 shows a block diagram 700 of a configuration for implementing a UE 115-c. The UE 115-c may be an example of one or more aspects of a UE 115 or wireless communications device 605 described with reference to FIGS. 1, 6A, 6B, and/or 6C. The UE 115-c may include one or more antennas 705 configured to receive and transmit wireless signals in cooperation with one or more transceiver modules 710. The UE 115-c may further include a compression management module 615-c, a processor module 725, and a memory 715, each of which may be in communication, directly or indirectly, with each other (e.g., over one or more buses 750).

The transceiver module 710 may be configured to communicate, via the antenna(s) 705, with other UEs and/or base stations of one or more networks. Thus, the transceiver module 710 or transceiver may be means for sending, transmitting, receiving and/or determining, alone or in combination with the various other modules of the UE 115-c and/or the antenna(s) 705. The transceiver module 710 may include a modem configured to modulate the packets and provide the modulated packets to the antenna(s) 705 for transmission, and to demodulate packets received from the antenna(s) 705.

The memory 715 may include random access memory (RAM) and read-only memory (ROM). The memory 715 may also store computer-readable, computer-executable software code 720 containing instructions that are configured to, when executed, cause the processor module 725 to perform various functions described herein (e.g., compression determination, monitoring, detecting, determining, sending/transmitting, receiving, controlling, etc.). Alternatively, the software code 720 may not be directly executable by the processor module 725, but may be configured to cause a computer, e.g., when compiled and executed, to perform functions described herein. Thus, the processor module 725 or processor may be means for initiating, establishing, starting, transmitting, monitoring restarting, setting, incrementing, resetting, determining, etc., alone or in combination with the memory 715 and the software code 720. The processor module 725 may include an intelligent hardware device, e.g., a central processing unit (CPU), a microcontroller, an application-specific integrated circuit (ASIC), etc.

The compression management module 615-c may be configured to perform various monitoring, detecting or determining operations as described herein. The compression management module 615-c may perform such operations in conjunction with the transceiver 710 and the antenna(s) 705. Further, the compression management module 615-c may operate to under the control of the processor module 525. The compression management module 615-c may be an example of the compression management modules 615 of FIGS. 6A, 6B, and/or 6C, and may implement the functionality for these modules described above. Although the compression management module 615-c is shown separately, the functionality of the compression management module 615-c may be implemented as a component of the transceiver module 710, as a computer program product, and/or as one or more controller elements of the processor module 725.

The components of the UE 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UE 115-c.

Figure 8:
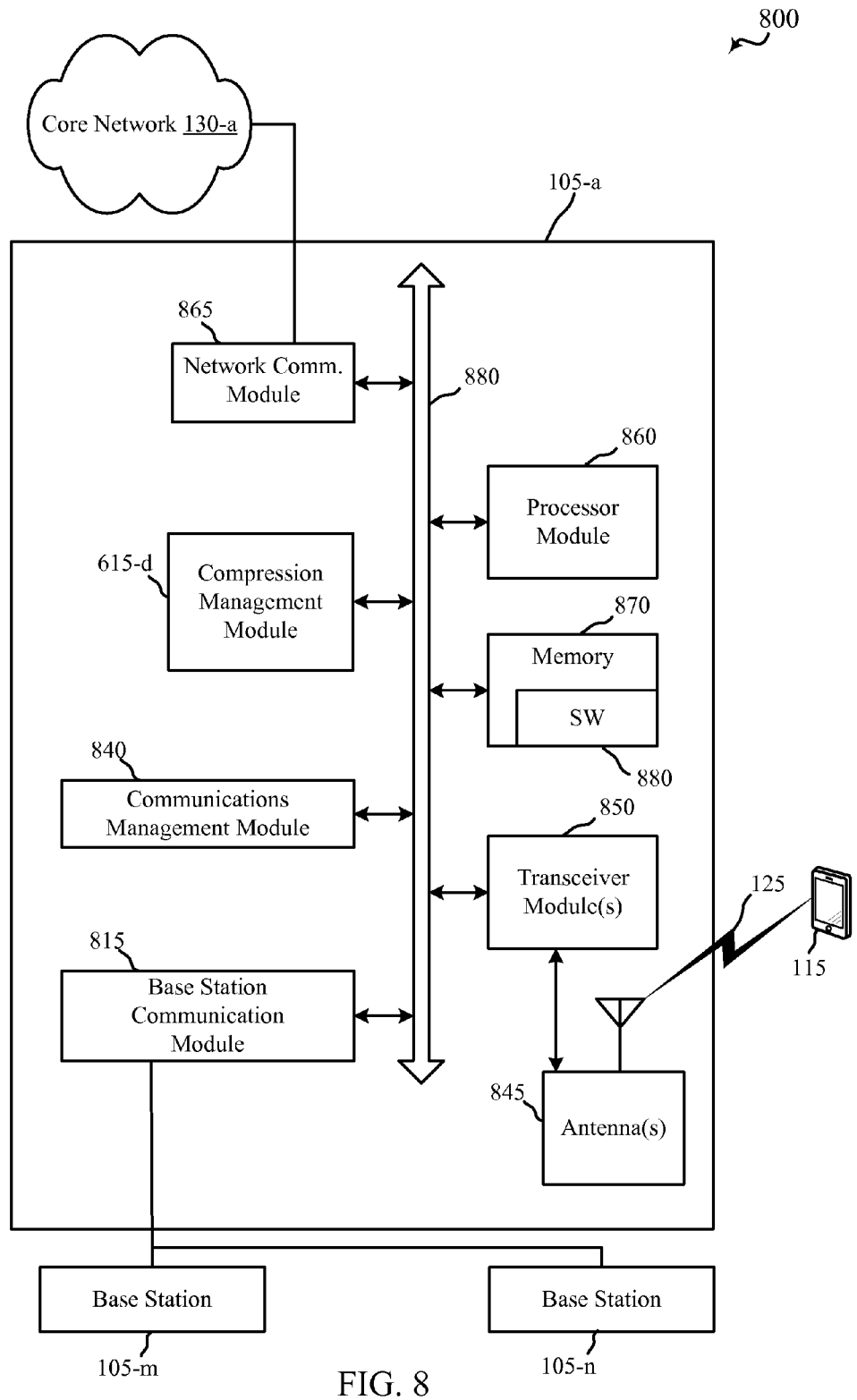
FIG. 8 shows a block diagram of a configuration for implementing a base station according to aspects of the disclosure.

Next, FIG. 8 shows a block diagram of an example system 800 configured for effective compression and payload management based on compression states, in accordance with various embodiments. This system 800 may be an example of aspects of the system 100 depicted in FIG. 1. The system 800 includes a base station 105-b configured for communication with UEs 115 over wireless communication links 125. The base station 105-b may be capable of receiving communication links 125 from other base stations (not shown). The base station 105-b may be, for example, a base station 105 as illustrated in FIG. 1, and/or may implement aspects of wireless communications device 605 of FIGS. 6A, 6B, and/or 6C.

In some cases, the base station 105-b may have one or more wired backhaul links. The base station 105-b may be a macro base station having a wired backhaul link (e.g., S1 interface, etc.) to the core network 130-a. The base station 105-b may also communicate with other base stations 105, such as base station 105-m and base station 105-n via inter-base station communication links (e.g., X2 interface, etc.). Each of the base stations 105 may communicate with UEs 115 using the same or different wireless communications technologies. In some cases, base station 105-b may communicate with other base stations such as 105-m and/or 105-n utilizing base station communication module 815. In some embodiments, base station communication module 815 may provide an X2 interface within an LTE/LTE-A wireless communication network technology to provide communication between some of the base stations 105. In some embodiments, base station 105-b may communicate with other base stations through core network 130-a. In some cases, the base station 105-b may communicate with the core network 130-a through network communications module 865. The components for the base station 105-b may be configured to implement aspects discussed above with respect to base stations 105 of FIG. 1, and/or wireless communications devices 605 of FIGS. 6A, 6B, and/or 6C. For example, the base station 105-b may be configured to receive compressed or uncompressed header transmissions and/or to send compressed or uncompressed header transmissions, including transmissions with combined headers and/or dropped payload, such as described above.

The base station 105-b may include antennas 845, transceiver modules 850, a processor module 860, and memory 870 (including software (SW) 875), and which each may be in communication, directly or indirectly, with each other (e.g., over bus system 880). The transceiver modules 850 may be configured to communicate bi-directionally, via the antennas 845, with one or more UEs 115. The transceiver module 850 (and/or other components of the base station 105-b) may also be configured to communicate bi-directionally, via the antennas 845, with one or more other base stations (not shown). The transceiver module 850 may include a modem configured to modulate the packets and provide the modulated packets to the antennas 845 for transmission, and to demodulate packets received from the antennas 845. The base station 105-b may include multiple transceiver modules 850, each with one or more associated antennas 845.

The memory 870 may include random access memory (RAM) and read-only memory (ROM). The memory 870 may also store computer-readable, computer-executable software code 875 containing instructions that are configured to, when executed, cause the processor module 860 to perform various functions described herein (e.g., header compression, PDU segmentation determination, dropping payload, combined header and payload size determination, etc.). Alternatively, the software 875 may not be directly executable by the processor module 860 but be configured to cause the computer, e.g., when compiled and executed, to perform functions described herein.

The processor module 860 may include an intelligent hardware device, e.g., a central processing unit (CPU), a microcontroller, an application-specific integrated circuit (ASIC), etc. The processor module 860 may include various special purpose processors such as encoders, queue processing modules, base band processors, radio head controllers, digital signal processors (DSPs), and the like.

According to the architecture of FIG. 8, the base station 105-b may further include a communications management module 840. The communications management module 840 may manage communications with other base stations 105. The communications management module may include a controller and/or scheduler for controlling communications with UE 115 in cooperation with other base stations 105.

Additionally or alternatively, the base station 105-b may include a compression management module 615-d, which may be configured substantially the same as the modules 615 described with reference of FIGS. 6A, 6B, and/or 6C. In some embodiments, the compression management module 615-*d* may be a component of the base station 105-*b* in communication with some or all of the other components of the base station 105-*b* via the bus 880. Alternatively, functionality of the compression management module 615-*d* may be implemented as a component of the transceiver module 850, as a computer program product, as one or more controller elements of the processor module 860, and/or as an element of the communications management module 840.

Figure 9:
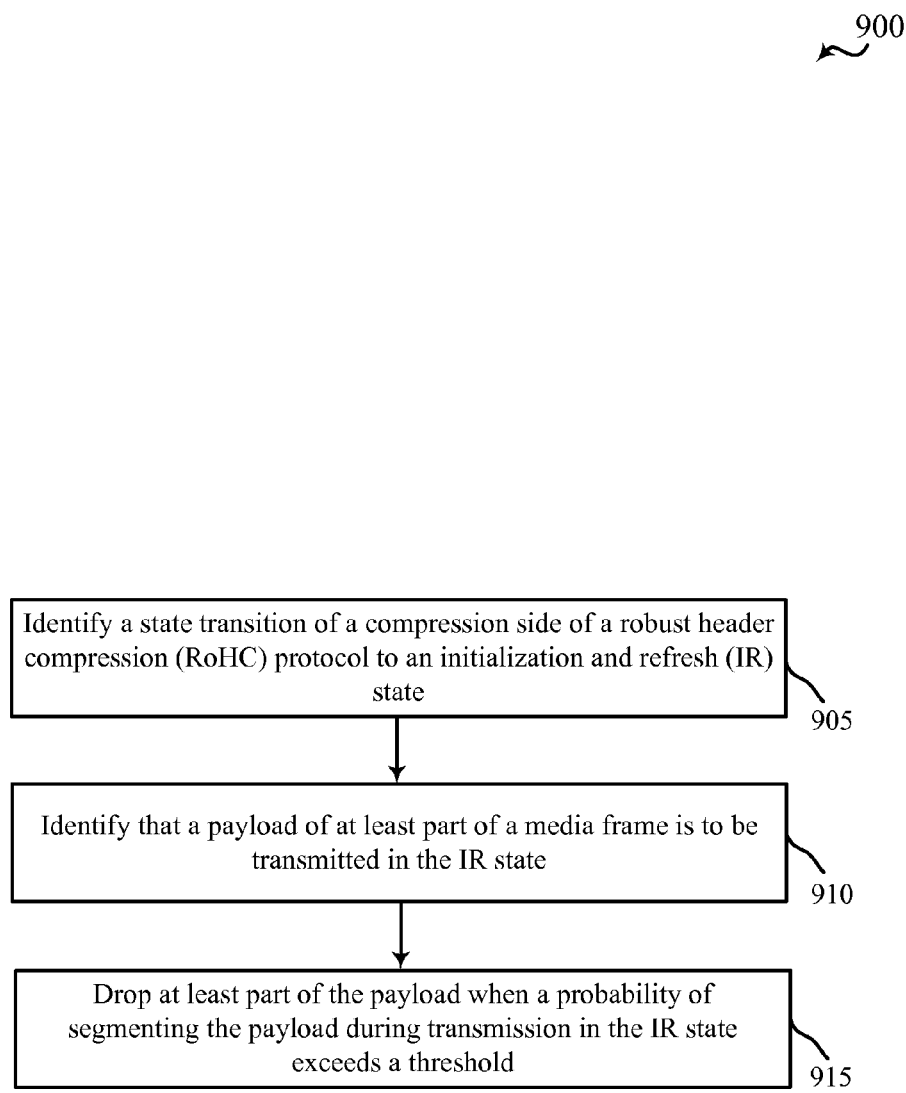
FIG. 9 is a flowchart of a method for reducing payload size for a wireless communications device according to aspects of the disclosure.

FIG. 9 is a flowchart of a method 900 for compression and payload management for a wireless communications device. For clarity, the method 900 is described below with reference to aspects of one or more of the UEs 115, base stations 105, and/or wireless communications devices 605 described with reference to FIGS. 1, 6A, 6B, 6C, 7 and/or 8. In one implementation, a UE 115, a base station 105, and/or a wireless communications device 605, or a processor module thereof, may execute one or more sets of codes to control the functional elements of the device to perform the functions described below.

At block 905, a state transition of a compression side of a robust header compression (RoHC) protocol to an initialization and refresh (IR) state may be identified. Such a state transition may be identified as described above, such as, for example, through monitoring of a compression state and determining that an IR fallback has occurred. At block 910, it may be identified that a payload of at least part of a media frame is to be transmitted in the IR state. At block 915, at least part of the payload is dropped when a probability of segmenting the payload during transmission in the IR state exceeds a threshold. Such dropping of payload may be performed as described above, according to various examples.

Figure 10:
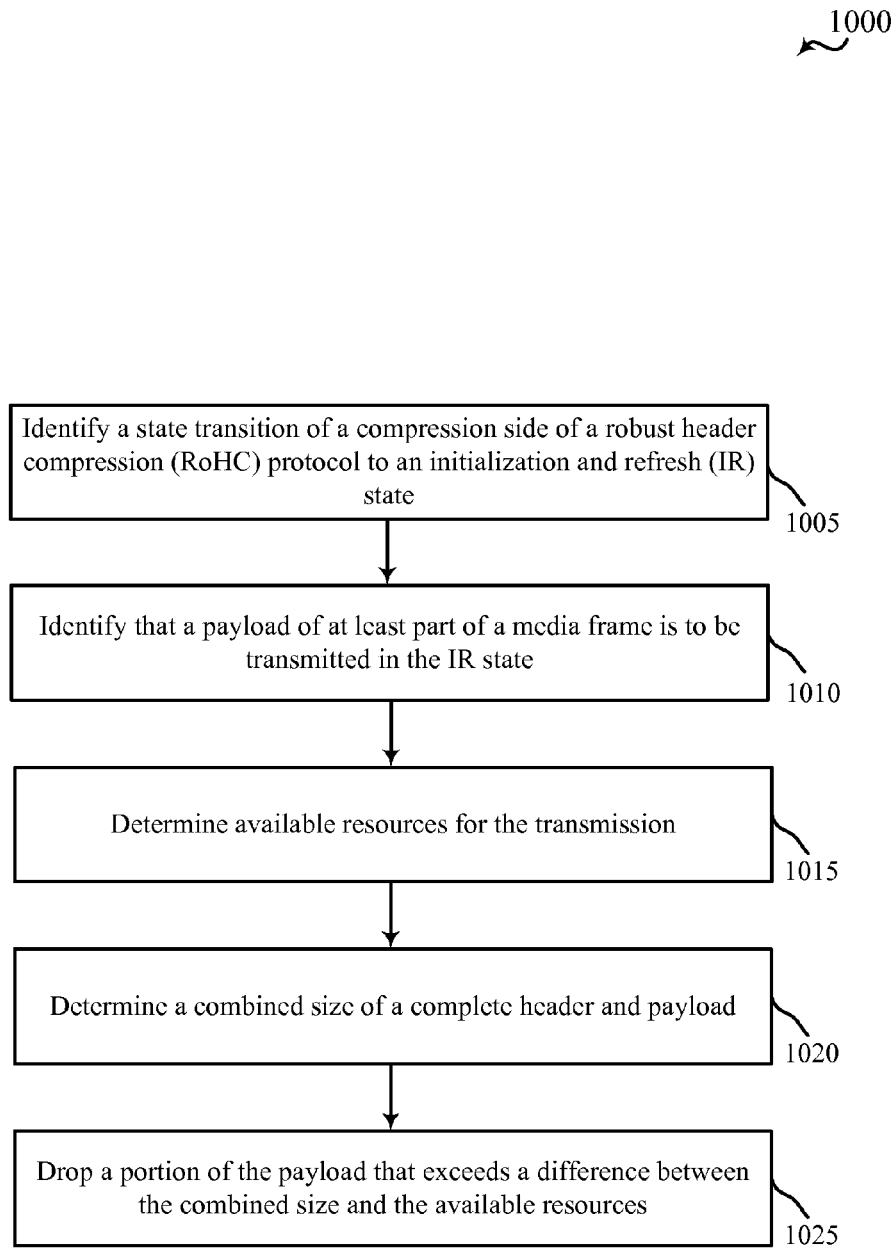
FIG. 10 is a flowchart of another method for reducing payload size for a wireless communications device according to aspects of the disclosure

FIG. 10 is a flowchart of a method 1000 for compression and payload management for a wireless communications device. For clarity, the method 1000 is described below with reference to aspects of one or more of the UEs 115, base stations 105, and/or wireless communications devices 605 described with reference to FIGS. 1, 6A, 6B, 6C, 7 and/or 8. In one implementation, a UE 115, a base station 105, and/or a wireless communications device 605, or a processor module thereof, may execute one or more sets of codes to control the functional elements of the device to perform the functions described below.

At block 1005, a state transition of a compression side of a robust header compression (RoHC) protocol to an initialization and refresh (IR) state may be identified. Such a state transition may be identified as described above, such as, for example, through monitoring of a compression state and determining that an IR fallback has occurred. At block 1010, it may be identified that a payload of at least part of a media frame is to be transmitted in the IR state. At block 1015, available resources for transmission are determined. For example, available uplink or downlink resources for the transmission may be determined. A combined size of a complete header and payload is determined at block 1020. Next, at block 1025, a portion of the payload that exceeds a difference between the combined size and the available resources may be dropped.

Figure 11:
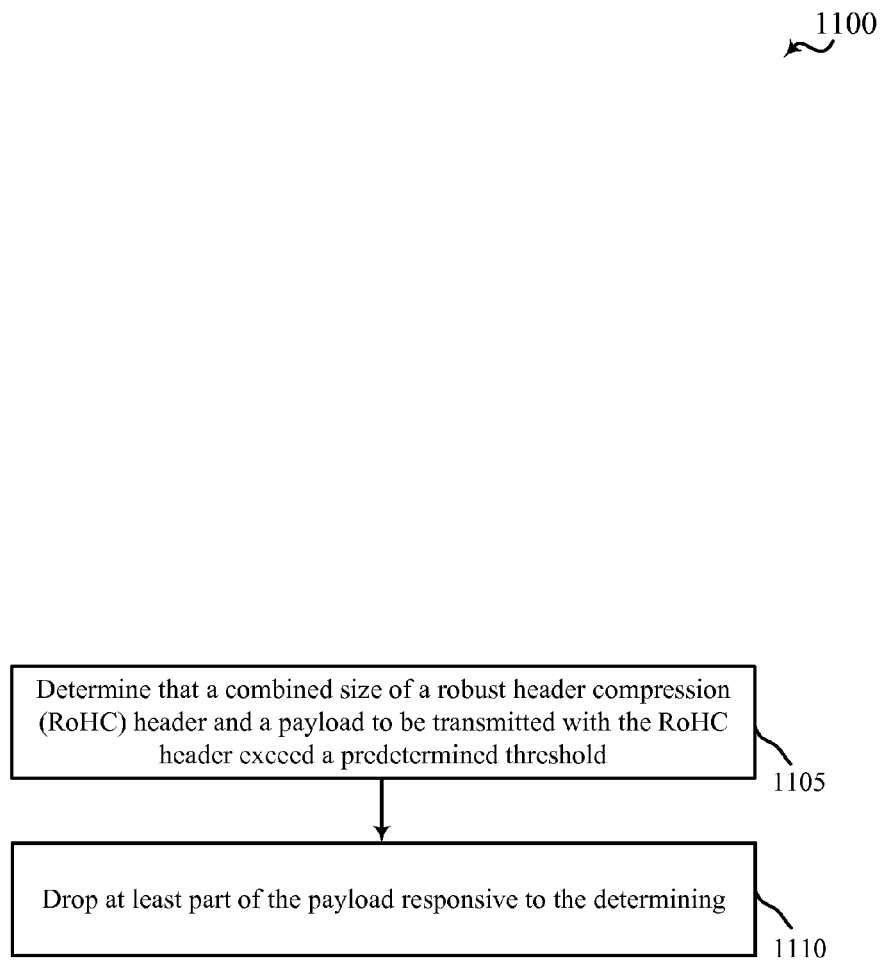
FIG. 11 is a flowchart of yet another method for reducing payload size for a wireless communications device according to aspects of the disclosure.

FIG. 11 is a flowchart of a method 1100 for compression and payload management for a wireless communications device. For clarity, the method 1100 is described below with reference to aspects of one or more of the UEs 115, base stations 105, and/or wireless communications devices 605 described with reference to FIGS. 1, 6A, 6B, 6C, 7 and/or 8. In one implementation, a UE 115, a base station 105, and/or a wireless communications device 605, or a processor module thereof, may execute one or more sets of codes to control the functional elements of the device to perform the functions described below.

At block 1105, it may be determined that a combined size of a robust header compression (RoHC) header and a payload to be transmitted with the RoHC header exceed a predetermined threshold. At block 1110, at least part of the payload may be dropped responsive to the determining.

Figure 12:
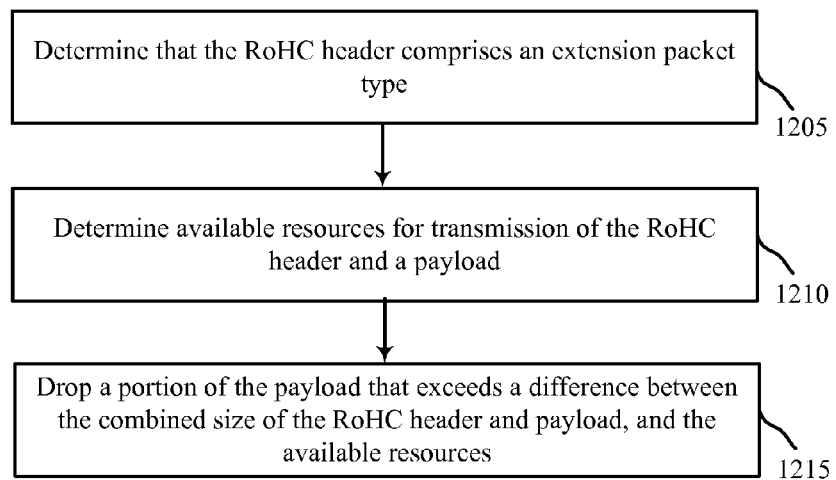
FIG. 12 is a flowchart of still another method for reducing payload size for a wireless communications device according to aspects of the disclosure.

FIG. 12 is a flowchart of a method 1200 for compression and payload management for a wireless communications device. For clarity, the method 1200 is described below with reference to aspects of one or more of the UEs 115, base stations 105, and/or wireless communications devices 605 described with reference to FIGS. 1, 6A, 6B, 6C, 7 and/or 8. In one implementation, a UE 115, a base station 105, and/or a wireless communications device 605, or a processor module thereof, may execute one or more sets of codes to control the functional elements of the device to perform the functions described below.

At block 1205, it may be determined that a RoHC header comprises an extension packet type. At block 1210, available resources for transmission of the RoHC header and a payload are determined. For example, available uplink or downlink resources for the transmission may be determined. At block 1215, a portion of the payload may be dropped that exceeds a difference between the combined size of the RoHC header and payload, and the available resources.

Figure 13:
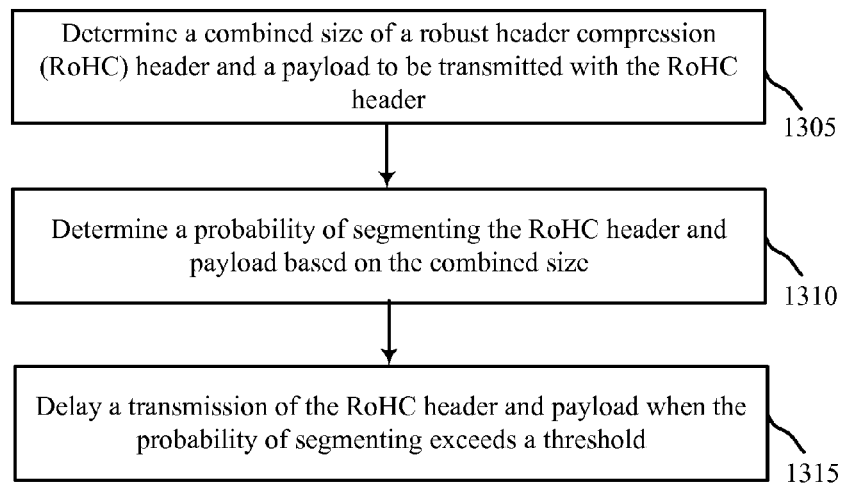
FIG. 13 is a flowchart of a further method for reducing payload size for a wireless communications device according to aspects of the disclosure.

FIG. 13 is a flowchart of a method 1300 for compression and payload management for a wireless communications device. For clarity, the method 1300 is described below with reference to aspects of one or more of the UEs 115, base stations 105, and/or wireless communications devices 605 described with reference to FIGS. 1, 6A, 6B, 6C, 7 and/or 8. In one implementation, a UE 115, a base station 105, and/or a wireless communications device 605, or a processor module thereof, may execute one or more sets of codes to control the functional elements of the device to perform the functions described below.

At block 1305, a combined size of a robust header compression (RoHC) header and a payload to be transmitted with the RoHC header is determined. At block 1310, a probability of segmenting the RoHC header and payload based on the combined size is determined. At block 1315, a transmission of the RoHC header and payload is delayed when the probability of segmenting exceeds a threshold. In some examples, the probability of segmenting may be determined based on an amount of available resources for transmission, a size of the RoHC header, and a size of the payload. Delaying the transmission may include, for example, delaying the transmission until sufficient resources are available for transmission of the RoHC header and payload without segmenting.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Thus, the foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
   identifying a state transition of a compressor side of a robust header compression (RoHC) protocol to an initialization and refresh (IR) state;
   identifying that a payload of at least part of a media frame is to be transmitted in the IR state; and
   dropping at least part of the payload when a probability of segmenting the payload during transmission in the IR state exceeds a threshold.

2. The method of claim 1, wherein the probability of segmenting the payload is based at least in part on a predetermined number of protocol data units (PDUs) exceeding a PDU count threshold.

3. The method of claim 1, wherein the probability of segmenting the payload is based at least in part on resources available for the transmission of a RoHC header and the payload.

4. The method of claim 3, wherein the resources comprise one or more of:
an amount of uplink resources assigned in an uplink grant;
an amount of downlink resources available for the transmission; or
a modulation and coding scheme to be used for the transmission.

5. The method of claim 3, wherein the probability of segmenting the payload is based at least in part on a power headroom value.

6. The method of claim 1, wherein the probability of segmenting the payload is based at least in part on one or more of:
a channel condition of an radio frequency (RF) channel used for the transmission;
a Sounding Reference Signal (SRS) measurement;
a distance from a receiver of the transmission; or
a pathloss from the receiver of the transmission.

7. The method of claim 1, wherein the identifying the transition of RoHC to the IR state comprises one or more of:
identifying a handover condition;
identifying an media frame error rate; or
identifying a Block Error Rate exceeding a threshold.

8. The method of claim 1, wherein the dropping at least part of the payload comprises:
dropping a predetermined number of protocol data units (PDUs).

9. The method of claim 8, wherein the predetermined number of PDUs is based at least in part on a data type of the payload.

10. The method of claim 8, wherein the predetermined number of PDUs is based at least in part on the segmentation of the payload exceeding a certain number of PDUs.

11. The method of claim 1, wherein the dropping at least part of the payload comprises:
determining an amount of available resources for transmission;
determining a combined size of a complete header and the payload; and
dropping a portion of the payload that exceeds a difference between the combined size and the amount of available resources.

12. The method of claim 11, wherein dropping at least part of the payload comprises
dropping least significant bit(s) of the payload that exceed the difference between the combined size and the amount of available resources.

13. A method of wireless communication, comprising:
determining that a combined size of a first robust header compression (RoHC) header and a first payload to be transmitted with the first RoHC header exceed a predetermined threshold;
dropping at least part of the first payload, responsive to the determining, to keep the combined size less than the predetermined threshold;
determining that a second combined size of a second RoHC header and a second payload to be transmitted with the second RoHC header exceed the predetermined threshold;
dropping at least part of the second payload to generate a modified second payload; and
transmitting the second RoHC header and modified second payload in place of the payload.

14. The method of claim 13, wherein the dropping comprises dropping a contiguous part of the first or second payload.

15. The method of claim 13, wherein the dropped part of the first or second payload is unrecoverable.

16. The method of claim 13, wherein the predetermined threshold is determined based on:
an amount of available resources for transmission;
a size of the first or the second RoHC header; and
a size of the first or the second payload.

17. The method of claim 16, wherein the dropping at least part of the first or second payload comprises:
dropping a portion of the first or second payload that exceeds a difference between the combined size of the respective RoHC header and the respective payload, and the amount of available resources.

18. The method of claim 13, wherein dropping at least part of the payload comprises:
dropping one or more least significant bit(s) of the payload that exceed a difference between the combined size of the RoHC header and the payload, and an amount of available resources.

19. An apparatus for wireless communication, comprising:
means for identifying a state transition of a robust header compression (RoHC) mode to an initialization and refresh (IR) state;
means for identifying that a payload of at least part of a media frame is to be transmitted in the IR state; and
means for dropping at least part of the payload when a probability of segmenting the payload during transmission in the IR state exceeds a threshold.

20. The apparatus of claim 19, wherein the probability of segmenting the payload is based at least in part on a grant condition.

21. The apparatus of claim 20, wherein the grant condition comprises one or more of an amount of uplink resources assigned in an uplink grant or a modulation and coding scheme of the uplink grant.

22. The apparatus of claim 20, wherein the probability of segmenting the payload is based at least in part on one or more of:
a predetermined number of protocol data units (PDUs) exceeding a PDU threshold;
a power headroom index value;
a channel condition of an radio frequency (RF) channel used for the transmission;
a distance from a receiver of the transmission; or
a pathloss from the receiver of the transmission.

23. The apparatus of claim 19, wherein the means for identifying the transition of RoHC to the IR state identifies one or more of a handover condition, a media frame error rate, or a Block Error Rate exceeding a threshold.

24. The apparatus of claim 19, wherein the means for dropping at least part of the payload:
determines an available uplink capacity for an uplink grant;
determines a combined size of a complete header and the payload; and
drops a portion of the payload that exceeds a difference between the combined size and the available uplink capacity.

25. An apparatus for wireless communication, comprising:
a processor;
memory in electronic communication with the processor, the memory embodying instructions, the instructions being executable by the processor to:
identify a state transition of a robust header compression (RoHC) mode to an initialization and refresh (IR) state;

identify that a payload of at least part of a media frame is to be transmitted in the IR state; and drop at least part of the payload when a probability of segmenting the payload during transmission in the IR state exceeds a threshold.

26. The apparatus of claim 25, wherein the probability of segmenting the payload is based at least in part on one or more of:

a predetermined number of protocol data units (PDUs) exceeding a PDU threshold;

a grant condition;

a channel condition of an radio frequency (RF) channel used for the transmission;

a distance from a receiver of the transmission; or a pathloss from the receiver of the transmission.

27. The apparatus of claim 25, wherein the instructions are further executable by the processor to identify one or more of a handover condition, a media frame error rate, or a Block Error Rate exceeding a threshold.

28. The apparatus of claim 25, wherein the instructions are further executable by the processor to:

determine an available uplink capacity for an uplink grant;

determine a combined size of a complete header and the payload; and drop a portion of the payload that exceeds a difference between the combined size and the available uplink capacity.

\* \* \* \* \*